(12) United States Patent
Mukherjee et al.

(10) Patent No.: US 11,080,487 B2
(45) Date of Patent: Aug. 3, 2021

(54) INTELLIGENT COMMUNICATION MESSAGE COMPLETION

(71) Applicant: INTERNATIONAL BUSINESS MACHINES CORPORATION, Armonk, NY (US)

(72) Inventors: Maharaj Mukherjee, Poughkeepsie, NY (US); Jonathan Lechner, North Salem, NY (US); Lisa Seacat Deluca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/193,575

(22) Filed: Nov. 16, 2018

(65) Prior Publication Data
US 2020/0159995 A1     May 21, 2020

(51) Int. Cl.
*G06F 40/30* (2020.01)
*G06N 99/00* (2019.01)
*H04L 12/58* (2006.01)

(52) U.S. Cl.
CPC .............. *G06F 40/30* (2020.01); *G06N 99/00* (2013.01); *H04L 51/02* (2013.01)

(58) Field of Classification Search
CPC .......... G06F 40/30; G06N 99/00; H04L 51/02
See application file for complete search history.

(56) References Cited

U.S. PATENT DOCUMENTS

| | | | |
|---|---|---|---|
| 7,908,287 B1 | 3/2011 | Katragadda | |
| 8,112,708 B2 | 2/2012 | Griffin et al. | |
| 9,218,333 B2 | 12/2015 | Liensberger | |
| 9,330,082 B2 | 5/2016 | Tseng et al. | |
| 2014/0195621 A1* | 7/2014 | Rao DV | H04L 12/1827 709/206 |
| 2014/0297267 A1* | 10/2014 | Spencer | G06F 40/274 704/9 |
| 2015/0067491 A1 | 3/2015 | Rajamony et al. | |
| 2017/0249059 A1 | 8/2017 | Houseworth | |
| 2017/0316484 A1 | 11/2017 | Holmes et al. | |

OTHER PUBLICATIONS

"Location-sensitive Query Auto-completion" Lin et al. International World Wide Web Conference Committee (IW3C2), published under Creative Commons CC BY 4.0 License. WWW 2017 Companion, Apr. 3-7, 2017, Perth, Australia. (2 Pages).

* cited by examiner

*Primary Examiner* — Nafiz E Hoque
(74) *Attorney, Agent, or Firm* — Griffiths & Seaton PLLC

(57) ABSTRACT

Embodiments are provided for intelligent communication message completion in a computing system by a processor. A plurality of contextual factors associated with a communication dialog may be determined and learned. A communication message may be automatically completed according to the plurality of contextual factors associated with the communication dialog.

20 Claims, 6 Drawing Sheets

US 11,080,487 B2

INTELLIGENT COMMUNICATION MESSAGE COMPLETION

BACKGROUND OF THE INVENTION

Field of the Invention

The present invention relates in general to computing systems, and more particularly, to various embodiments for intelligent communication message completion by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information such as, for example, communication messages sent and received between different computing systems.

SUMMARY OF THE INVENTION

Various embodiments of a cognitive system for implementing intelligent communication message completion in a computing system by a processor are provided. In one embodiment, by way of example only, a method for implementing intelligent communication message completion in a computing system, again by a processor, is provided. A plurality of contextual factors associated with a communication dialog may be determined and learned. A communication message may be automatically completed according to the plurality of contextual factors associated with the communication dialog.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
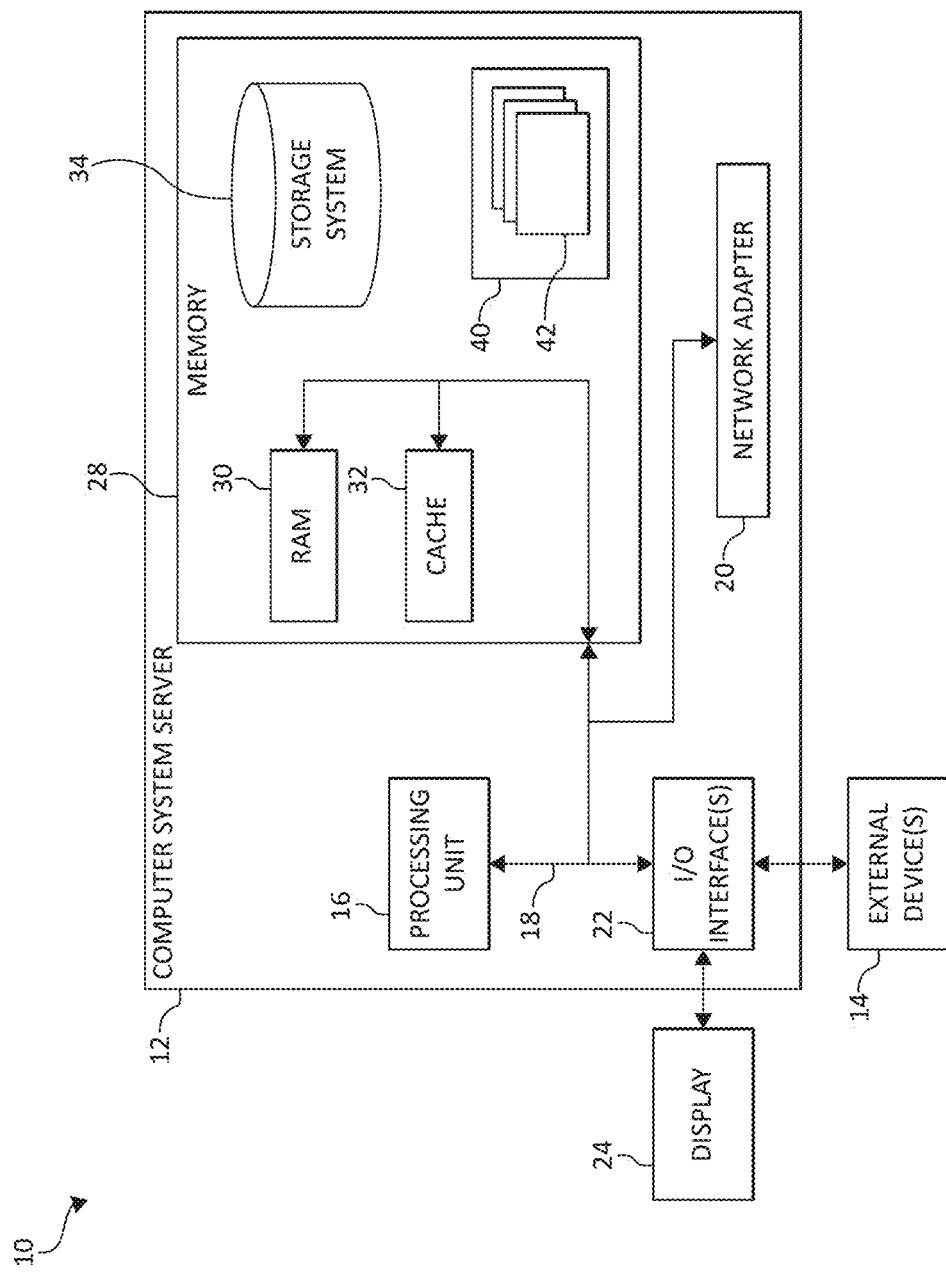
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

Currently, a wide variety of computing devices (e.g., computers, laptops, wireless communication devices, IoT device, etc.) are used for communicating with one or more other parties such as, for example, by sending emails, text messages, and even posting a communication message on a social media account. Text completion, complete-as-you-type, and autocorrect are time saving functions that may be included in a word processor and text editing interfaces for smartphones and tablet computers. A principal purpose of such text completion and text editing functionality is to save time for the user, sometimes correcting spelling errors. It is also used to automatically format text or insert special characters by recognizing particular character usage, saving the user from having to use more tedious character combinations. However, text messages and communications from digital computing devices are often times simple, commonly used, and/or lack the appropriate contextual understanding of the communication dialog of the parties involved despite text completion functionality. Thus, a need exists for providing an intelligent communication message completion according to contextual information associated with the parties and the communication dialog.

In one aspect, the present invention provides for a cognitive system that provides intelligent communication message completion in a computing system. A plurality of contextual factors associated with a communication dialog may be determined and learned. A communication message (e.g., social media posts/accounts, blogs, emails, text message data, etc.) may be automatically completed according to the plurality of contextual factors associated with the communication dialog.

The intelligent communication message completion operation may detect the context of the text entry based on a plurality of contextual factors such as, for example, geolocation, time of day or month, user's calendar (e.g., a birthday, anniversary or celebrations), a current status of one or more persons such as, for example, being in motion (e.g., traveling in a car/bus, walking, etc.) and/or being at home and direction of travel/motion and/or estimated time of arrival ("ETA") based on the mode of transport. The contextual factors may also include a user's and sender's preference of words and expressions and auto completes or auto corrects based on the determined contextual factors. The communication dialog may also be parsed and analyzed to identify additional contextual factors. The contextual factors may also include calendar data, audio communications, video communications, text data, monitored communications of the user, historical data, user preferences, location-based dependencies, alerts, notifications, environmental factors, age/maturity levels, biometric data, social factors, religious factors, cultural factors, ethnicity, and/or communication rules/factors.

For example, assume calendar data indicates that a user has a scheduled meeting/conference call at 4:00 p.m. and a dinner meeting at 5:00 p.m. During the scheduled meeting/conference, the user receives a text message from an associate with whom the user is scheduled to meet for dinner, stating "Hey, I'm just pulling up to the restaurant! Are you almost here?" The cognitive system, performing an intelligent communication message completion operation, determines the current status and/or location of the user (e.g., the user is still in the meeting and has not left the office). The cognitive system may dynamically display on a graphical user interface ("GUI") an autocompleted text response for the user to send such as, for example, "Sorry, I'm still in a meeting and I'll be 15 minutes late. Call you as soon as I leave the office." Alternatively, the cognitive system may contextually complete a message such as, for example, where the user starts typing "sorry, I am still in a . . . " and the cognitive system suggests the term "meeting" to complete the sentence.

Also, if the cognitive system may learn user preferences, habits, characteristics, and/or attributes to also use with the contextual data. For example, the cognitive system may learn the user always orders the same dinner selection at the restaurant (e.g., steak and mashed potatoes). Thus, the autocompleted text response for the user to send may more specifically state such as, for example, "Sorry, I'm still in meeting and I'll be 15 minutes late. Call you as soon as I leave the office. Will you order steak and mashed potatoes for me please?"

In an additional aspect, the intelligent communication message completion operation may perform an artificial intelligence ("AI") operation such as, for example, a natural language processing ("NLP") operation to determine one or more contextual factors and/or phrases of the text. Based on the determined contextual factors of current text in a communication, the intelligent communication message completion operation enables one of a variety applications to automatically and appropriately complete, suggest, correct, and/or generate all or portions of a communication message that matches the determined contextual information.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may AI logic, such as NLP based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
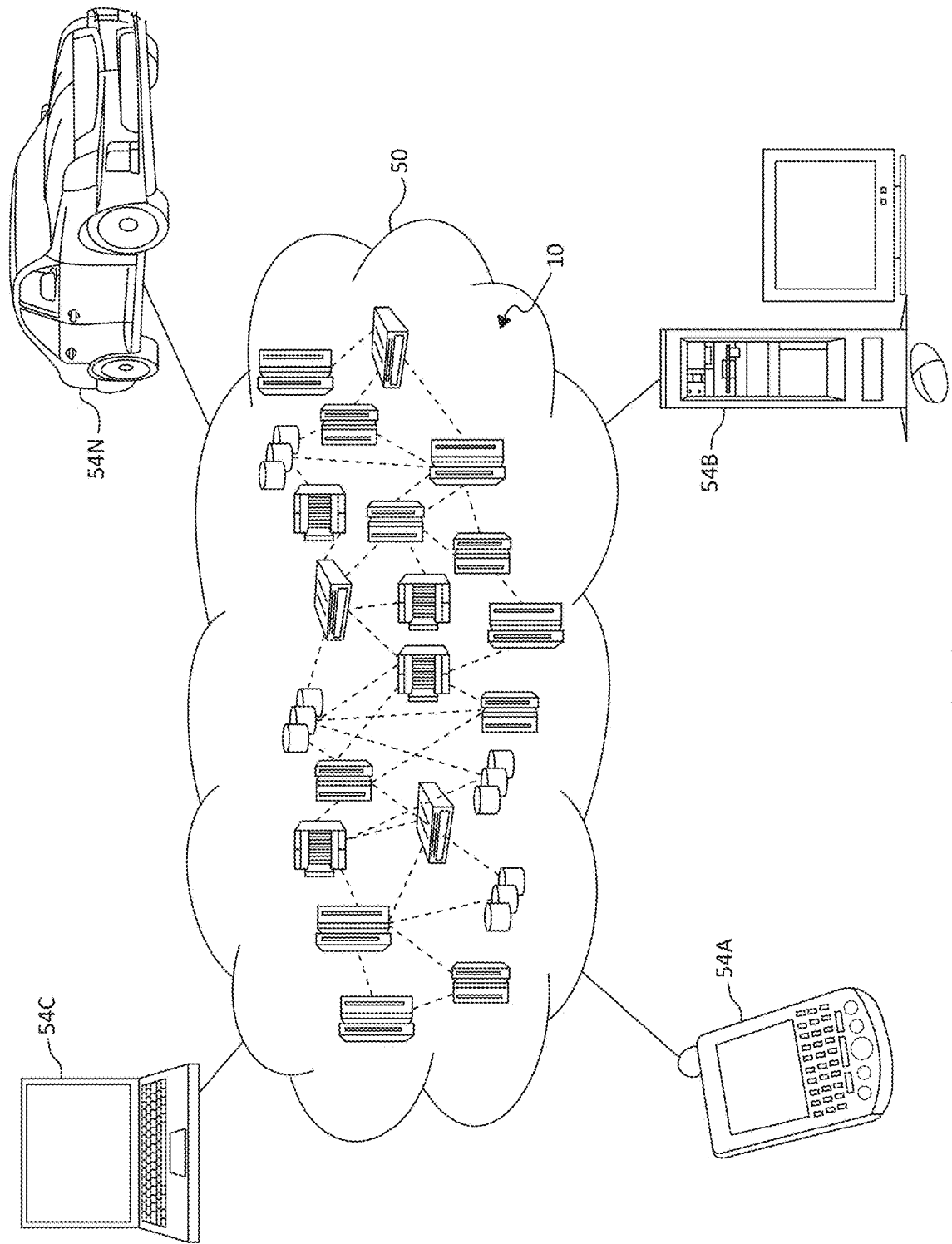
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
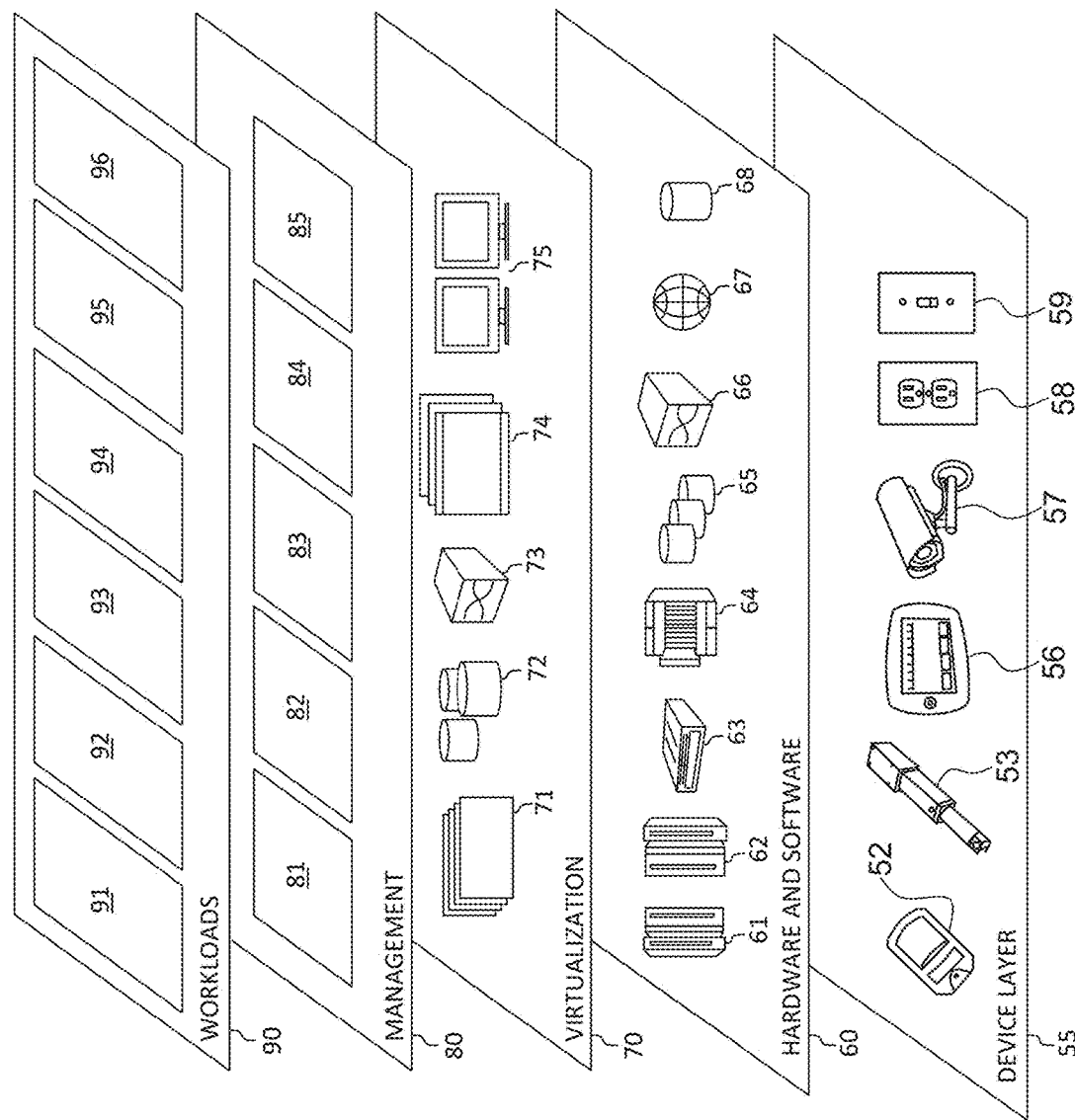
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent communication message completion and correction workloads and functions 96. In addition, intelligent communication message completion and correction workloads and functions 96 may include such operations as data analytics, data analysis, and as will be further described, notification functionality. One of ordinary skill in the art will appreciate that the intelligent message format automatic correction workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
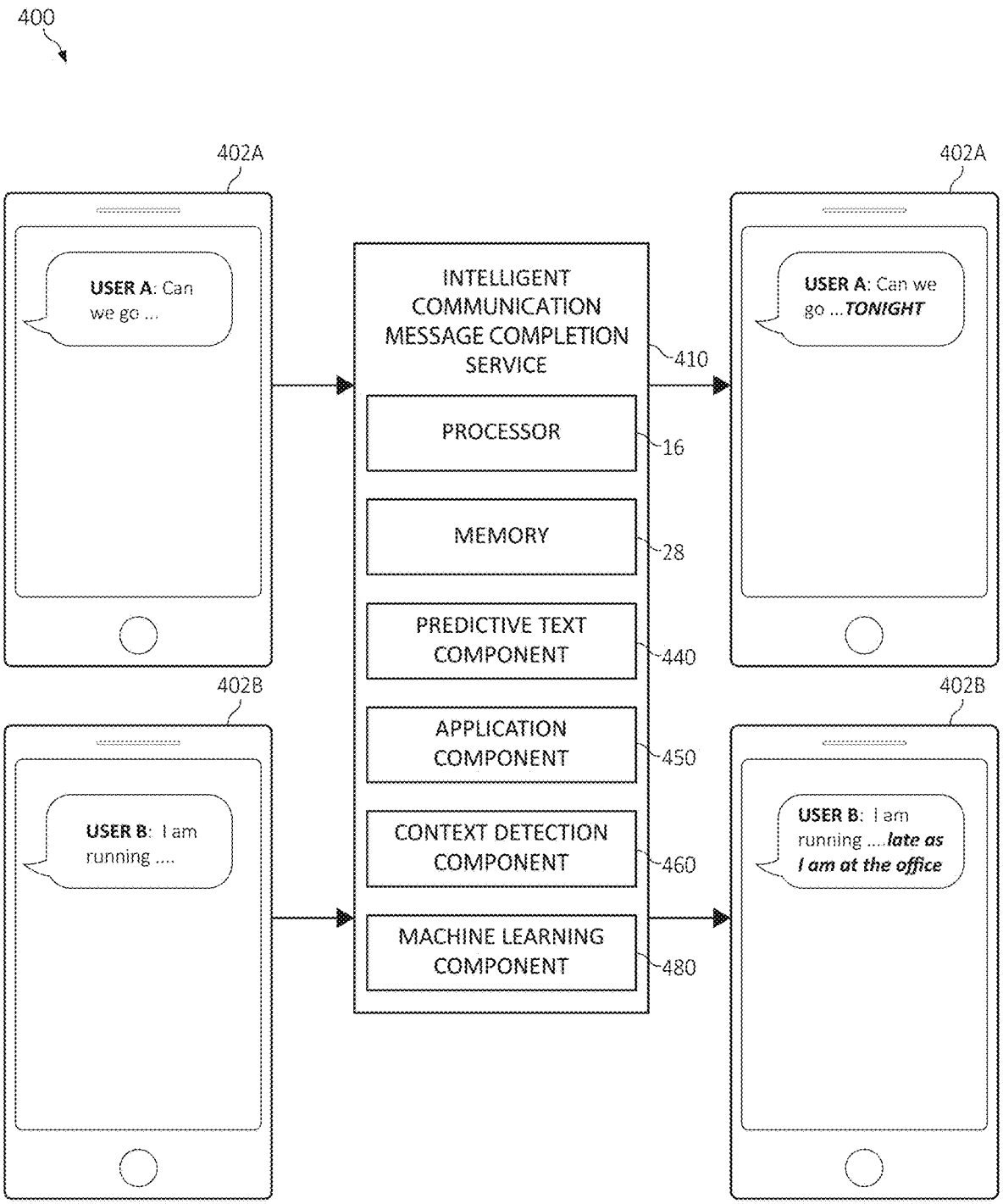
FIG. 4 is a block diagram depicting an operation mode for intelligent communication message completion in which various aspects of the present invention may be realized.

Turning now to FIG. 4 a block diagram depicting exemplary functional components 400 according to various mechanisms of the illustrated embodiments is shown. FIG. 4 illustrates systems 400 for intelligent communication message completion and correction in an IoT computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

As illustrated in FIG. 4, intelligent communication message completion service 410 is shown, incorporating processing unit 16 ("processors) and memory 28 of FIG. 1 to perform various computational, data processing and other functionality in accordance with various aspects of the present invention. The intelligent communication message completion service 410 may be provided by the computer system/server 12 of FIG. 1.

As one of ordinary skill in the art will appreciate, the depiction of the various functional units in the intelligent communication message completion service 410 is for purposes of illustration, as the functional units may be located within the intelligent communication message completion service 410 or elsewhere within and/or between distributed computing components.

The intelligent communication message completion service 410 may be in communication with and/or association with one or more computing devices 402A and/or 402B (e.g., an internet of things "IoT" computing device such as, for example, a smartphone, smartwatch, desktop computer, laptop computer, tablet, and/or another electronic device that may have one or more processors and memory and configured for capturing images or video data). The computing devices 402A and/or 402B and the intelligent communication message completion service 410 may each be associated with and/or in communication with each other, by one or more communication methods, such as a computing network, wireless communication network, or other network means enabling communication.

In one aspect, the intelligent communication message completion service 410 may provide virtualized computing services (i.e., virtualized computing, virtualized storage, virtualized networking, etc.) to the one or more computing devices 402A and/or 402B. More specifically, the intelligent communication message completion service 410 may provide, and/or be included in, a virtualized computing, virtualized storage, virtualized networking and other virtualized services that are executing on a hardware substrate.

The intelligent communication message completion service 410 may also function as a database and/or service that may store, maintain, and update data, services, and/or resources internal to and/or external to a cloud computing environment such as described in FIG. 2. In one aspect, intelligent communication message completion service 410 may assist in providing access to and/or assist in performing one or more various types of data, services and/or resources. In one aspect, the intelligent communication message completion service 410 may provide a predictive text component 440, an application component 450, context detection component 460 and a machine learning component 480.

The application component 450 may open one or more types of applications for communicating a message to one or more persons. The applications of the application component 450 may be enabled to perform a multimedia messaging, Short Message Service ("SMS"), social networking (e.g., social media communication of a social media account), audio or video social network sharing, an Instant Messaging (IM), E-mail, or other peer-to-peer communication operations. In short, the application component 450 provides a variety of types of applications having a variety of types of text fonts usable with the SMS, social media account, IM, E-mail, or other peer-to-peer communication applications.

The context detection component 460, in association with the machine learning component 480, may analyze text data using an NLP operation to identify one or more contextual factors in a communication prior to the user of the computing devices 402A and/or 402B sending the communication to another party using one of a plurality of applications from the application component 450. Moreover, the context detection component 460 may also search one or more data sources (e.g., computing devices, video/image capturing devices, audio capturing devices, sensor-based devices, IoT computing devices, online data sources such as, a website, online journals, or social media accounts/networks). The context detection component 460 may determine from the various data sources contextual data/factors such as, for example, calendar data, geolocation data, weather data, traffic data, road conditions data, event data (e.g., a meeting, activity, conference, vacations, etc.) biometric data, behavioral data, a preferred type of communication application (e.g., a text message service, social media platform, email service, etc.), and even the timing of the communication message itself (e.g., a text message from a parent to a child for the first time at the beginning of the day that states "have a good day at school").

The context detection component 460, in association with the predictive text component 440, may consider, determine, interpret, and/or analyze the contextual data/factors to complete, correct, and/or suggest text input data of a communication message. Moreover, context detection component 460, in association with the predictive text component 440, may define the plurality of contextual factors to include geolocation data, a time period, calendar data, a current status of one or more parties associated with the communication dialog, travel data, physical and biometric data of the one or more parties, user preferences, semantic preferences, or a combination thereof.

The context detection component 460, in association with the predictive text component 440, may interpret one or more contextual factors relating to text data in a communication prior to the user sending the communication to one or more persons using one of a plurality of applications. Pursuant to interpreting the one or more contextual factors, the predictive text component 440 may classify the plurality of contextual factors as primary factors or secondary factors.

In one aspect, each type of primary and secondary factor may be defined by a user or learned automatically via machine learning. For example, a primary factor may include geo location data (e.g., a geographical location of the user or computing device/IoT device), a user profile (e.g., including preferred communication words, expressions, and/or phrases, etc.), or a combination thereof. The secondary factors may include at least a time of day, a defined period, weather data, calendar data, one or more events, a defined location of one or more users, environmental factors, age/maturity levels, biometric data, social factors, religious factors, cultural factors, ethnicity, and/or communication rules/factors.

Thus, for example, geo-location data may be classified as a primary factor and may be used to find one or more secondary factors such as, for example, the time of the day, season of the year, current as well as future weather conditions, specific locations of a user such as, for example being at home, office, at a friend's or relative's place, a shopping location, and/or other locations. These secondary factors may be used to fine tune/adjust the context decisions to increase accuracy and efficiency of text completion, complete-as-you-type, and/or autocorrect.

More specifically, the context detection component 460 may detect the context of the text entry based on geolocation, time of the day or month, user's calendar (e.g., birthday, anniversary or celebrations, current status (e.g., being stationary, moving or being at home, office, being at particular location such as, for example, a home, office, friend/family residence, shopping location, and if traveling where the user is traveling to or heading and even an estimated time of arrival ("ETA") based on the mode of transportation, and/or preference of words and/or phrases of each user/sender. The detected expressions and automatically completes and/or corrects based the detected context.

The predictive text component 440 may automatically complete a communication message according to a plurality of contextual factors associated with a communication dialog. More specifically, the predictive text component 440 may automatically complete the communication message according to a plurality of contextual factors that may be classified as according to the primary factors, the secondary factors, or a combination thereof.

For example, the detected geolocation contextual data may be classified as a primary factor in the context decision that is used to find the time of the day, season of the year, current as well as future weather, and/or specific locations such as, for example, being at home, office, at a friend's, or relative's place, shopping location etc. The secondary factors are further used to fine tune, adjust, enhance, and/or clarify the context decisions. For example, a time of day and/or month, season, and/or calendar of a user may be classified as secondary factors. The current time and related events future refines the context.

Thus, in operation, the predictive text component 440 provides for automatic text completion during a communication dialog on one or more types of applications (e.g., a social media, email application, text message application) for a user's communications (e.g., social media post, email, IM, peer-to-peer communication, etc.).

The machine learning component 480, in association with the predictive text component 440, may be initialized to learn and train a predictive text model one various contextual factors and also learn one or more user preferences for preferred text data previously used in historical communication dialogs. The machine learning component 480, in association with the predictive text component 440, may combine the learned user preferences with the plurality of contextual factors for automatically completing the communication message. The machine learning operations may include various AI instances. These AI instances may include IBM® Watson® Alchemy Language (IBM Watson and Alchemy are trademarks of International Business Machines Corporation).

It should be noted that, the machine learning component 480, using a machine learning operation, may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In view of the foregoing, consider the following operations using the intelligent communication message completion service 410. Assume a user of computing device 402A opens a multimedia messaging application. Using computing device 402A, the user begins to input text data such as, for example, "Can we go . . . " As soon as the text data is entered, using the various components and functionality of FIG. 4, the intelligent communication message completion service 410 may analyze the communication and determine the context of the communication dialog. Thus, the intelligent communication message completion service 410 may suggest the next potential/predicted word in an auto-completion the as "Tonight" if the time is past 2:00 p.m. or "Today" if the context is still early in the morning.

As an alternative example, assume a user is using computing device 404B and intends to text another party (e.g., "recipient"). The intelligent communication message completion service 410 may determine the that the user is still at work (e.g., located in an office) and running late. The user may commence entering text data into computing device 404B by stating "I am running." As such, the intelligent communication message completion service 410 may be triggered and automatically complete the text with a word such as "late," or with a phrase such as, for example, "late as I am at the office" thereby, in the latter case, completing the phrase to "I am running late as I am at the office."

As an additional example, assume a calendar of a user is analyzed and reveals that the recipient is celebrating a birthday or anniversary. In one aspect, the intelligent communication message completion service 410 may complete the text message with a word after the user types "Happy" by automatically completing the text phrase with "birthday" or "anniversary" according to the determined contextual data.

If there is no personalized context available, the user may recommend something based on the celebration such as, for example, "thanksgiving: or "Christmas" or even "New Year." The predicted text may also be modified (e.g., geo-modified) based on the recipient or user's current location.

In an additional example, the intelligent communication message completion service 410 may determine the "current status" of a user as being stationary, moving, being at home, office, at a friend's or relative's residence, shopping location, and if moving, where the user is heading to and the ETA according to the mode of transport. Thus, the intelligent communication message completion service 410 may automatically complete the text input of "I am at" with the text/phrase of "office," "home," "John Doe's home," or "Galleria Mall." Thus, the completed phrase, for example, would be "I am at John Doe's home."

Moreover, the intelligent communication message completion service 410 may determine the context of the mode of travel. Thus, based on the mode of travel, the ETA, as well as knowledge of traffic, the contextual data may be determined and used to complete the text input of "running" to "running late" (with "late" being the predicted text) or "running early" (with "early" being the predicted text) depending on the ETA.

Moreover, the user's and receiver's preference of words and expressions may be automatically learned by the intelligent communication message completion service 410. Thus, the intelligent communication message completion service 410 may recognize a user's preference of words based on the context of previously typed words while also considering the current contextual information associated with the user at the time of the communication dialog. For example, the intelligent communication message completion service 410 may determine that the user prefers the phrase "Have a good day at work" upon first texting the user's wife just after she leaves for work. Thus, as the user opens up an application and starts to first text the user's wife just after she leaves for work at 8:00 a.m. by inputting the word "have" the intelligent communication message completion service 410 may automatically complete the text input with "a good day at work" thereby completing the phrase "Have a good day at work." It should be noted, as used in this example, the intelligent communication message completion service 410 suggested and completed the text using the user's preferred phrase of "have a good day at work" based on the determined time of day (e.g., 8:00 a.m.) while detecting the user opened up a particular application and the text was the first text being sent to his wife after 8:00 a.m. In this way, the intelligent communication message completion service 410 may learn various contextual information, user preferences, behaviors, and/or interest for applying the text message completion operations.

Figure 5:
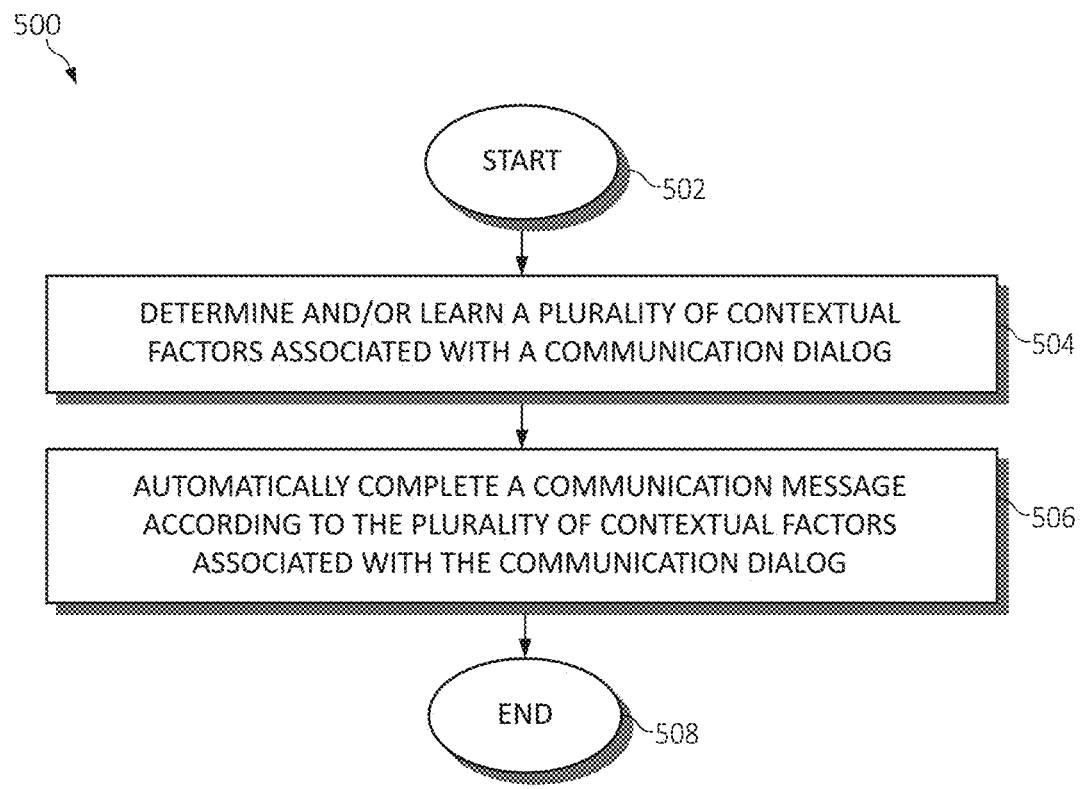
FIG. 5 is a flowchart diagram depicting an exemplary method for implementing intelligent communication message completion in a computing environment by a processor in which aspects of the present invention may be realized.

Turning now to FIG. 5, a method 500 for implementing intelligent communication message completion by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. As one of ordinary skill in the art will appreciate, the various steps depicted in method 500 may be completed in an order or version differing from the depicted embodiment to suit a particular scenario.

The functionality 500 may start in block 502. A plurality of contextual factors associated with a communication dialog may be determined and learned, as in block 504. A communication message may be automatically completed according to the plurality of contextual factors associated with the communication dialog, as in block 506. The functionality 500 may end, as in block 508.

Figure 6:
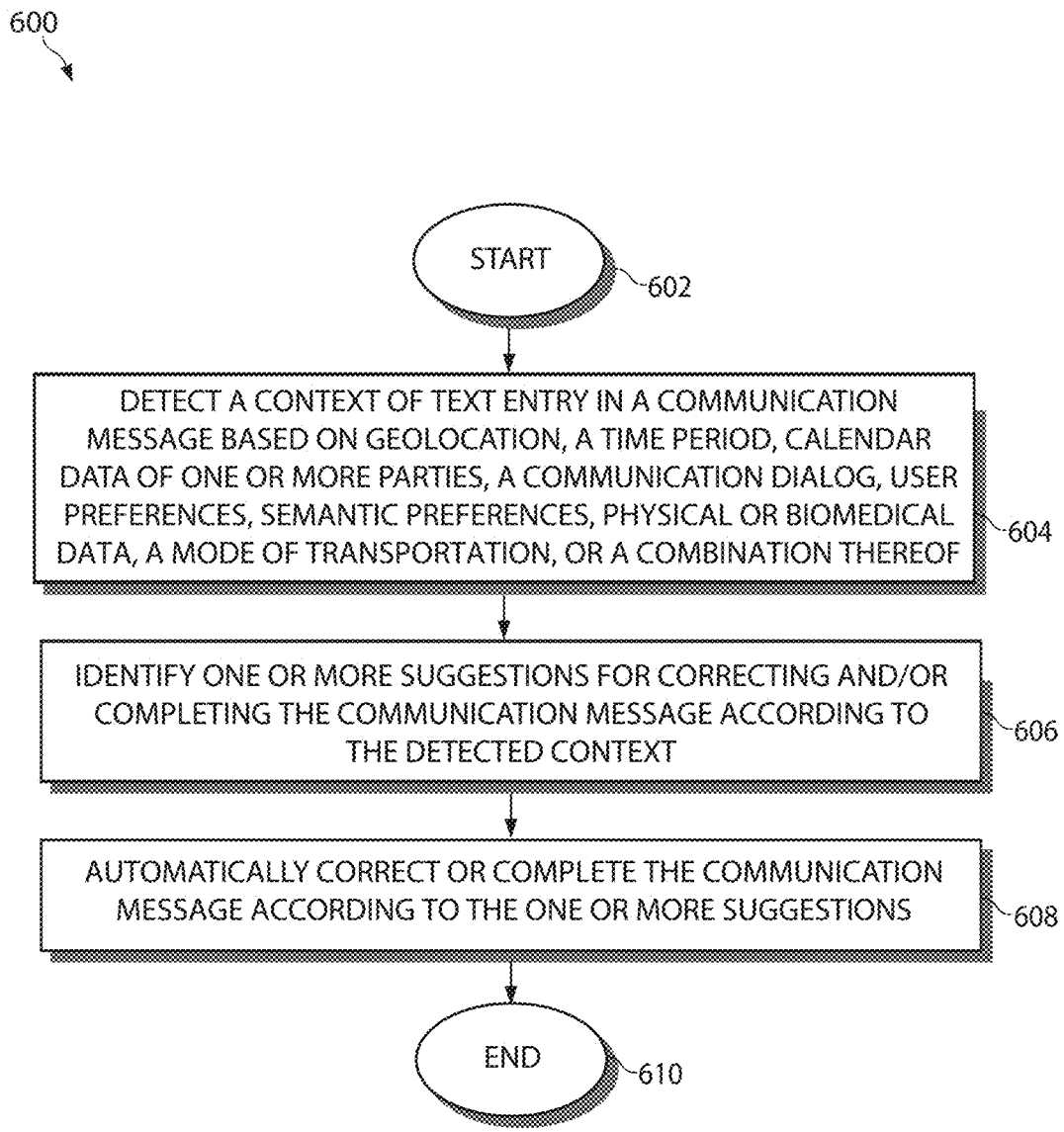
FIG. 6 is a flowchart diagram depicting an additional exemplary method for implementing intelligent communication message completion in a computing environment by a processor, again in which aspects of the present invention may be realized.

Turning now to FIG. 6, a method 600 for implementing intelligent communication message completion by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. As one of ordinary skill in the art will appreciate, the various steps depicted in method 600 may be completed in an order or version differing from the depicted embodiment to suit a particular scenario.

The functionality 600 may start in block 602. A context of text entry may be detected in a communication message based on geolocation, a time period, calendar data of one or more parties, a communication dialog, user preferences, semantic preferences, physical or biomedical data, a mode of transportation, or a combination thereof, as in block 604. One or more suggestions may be provided for correcting and/or completing the communication message according to the detected context, as in block 606. The communication message may be automatically completed and/or corrected according to the one or more suggestions, as in block 608. The functionality 600 may end in block 608.

In one aspect, in conjunction with and/or as part of at least one block of FIGS. 5-6, the operations of methods 500 and 600 may include each of the following. The operations of methods 500 and 600 may determine the plurality of contextual factors to complete text input data of the communication message using a machine learning operation, and/or classify the plurality of contextual factors as primary factors or secondary factors. The operations of methods 500 and 600 may complete the communication message according to the primary factors, the secondary factors, or a combination thereof.

The operations of methods 500 and 600 may further define the plurality of contextual factors to include geolocation data, a time period, calendar data, a current status of one or more parties associated with the communication dialog, travel data, physical and biometric data of the one or more parties, user preferences, semantic preferences, or a combination thereof learn one or more user preferences for preferred text data previously used in historical communication dialogs, and/or combine the one or more learned user preferences with the plurality of contextual factors for automatically completing the communication message. The operations of methods 500 and 600 may initiate a machine learning mechanism to learn and predict one or more semantic candidates to complete or correct the communication message according to the plurality of contextual factors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent communication message completion in a computing system by a processor, comprising:
    automatically completing a communication message according to a plurality of contextual factors associated with a communication dialog, wherein the plurality of contextual factors are classified as primary or secondary factors; and
    utilizing the primary factors to derive the secondary factors relevant to the communication dialog, wherein the secondary factors comprise spatiotemporal characteristics observed of a current and a predicted future environment of a user initiating the communication message and are utilized to enhance or adjust context decisions constituent to automatically completing the communication message such that textual content used to automatically complete the communication message is predicted to be contextually accurate according to the observed spatiotemporal characteristics.

2. The method of claim 1, further including determining the plurality of contextual factors to complete text input data of the communication message using a machine learning operation.

3. The method of claim 1, wherein the primary factors include at least a user profile, a geographical location, or combination thereof and the secondary factors include at least a selected period of time, weather data, calendar data, one or more events, a defined location, or a combination thereof.

4. The method of claim 3, further including automatically completing the communication message according to the primary factors, the secondary factors, or a combination thereof.

5. The method of claim 1, further including defining the plurality of contextual factors to include geolocation data, a time period, calendar data, a current status of one or more parties associated with the communication dialog, travel data, physical and biometric data of the one or more parties, user preferences, semantic preferences, or a combination thereof.

6. The method of claim 1, further including:
    learning one or more user preferences for preferred text data previously used in historical communication dialogs; and
    combining the one or more learned user preferences with the plurality of contextual factors for automatically completing the communication message.

7. The method of claim 1, further including initiating a machine learning mechanism to learn and predict one or more semantic candidates to complete or correct the communication message according to the plurality of contextual factors.

8. A system for intelligent communication message completion in a computing system, comprising:
    one or more computers with executable instructions that when executed cause the system to:
    automatically complete a communication message according to a plurality of contextual factors associated with a communication dialog, wherein the plurality of contextual factors are classified as primary or secondary factors; and
    utilize the primary factors to derive the secondary factors relevant to the communication dialog, wherein the secondary factors comprise spatiotemporal characteristics observed of a current and a predicted future environment of a user initiating the communication message and are utilized to enhance or adjust context decisions constituent to automatically completing the communication message such that textual content used to automatically complete the communication message is predicted to be contextually accurate according to the observed spatiotemporal characteristics.

9. The system of claim 8, wherein the executable instructions further determine the plurality of contextual factors to complete text input data of the communication message using a machine learning operation.

10. The system of claim 8, wherein the primary factors include at least a user profile, a geographical location, or combination thereof and the secondary factors include at least a selected period of time, weather data, calendar data, one or more events, a defined location, or a combination thereof.

11. The system of claim 10, wherein the executable instructions further complete the communication message according to the primary factors, the secondary factors, or a combination thereof.

12. The system of claim 8, wherein the executable instructions further define the plurality of contextual factors to include geolocation data, a time period, calendar data, a current status of one or more parties associated with the communication dialog, travel data, physical and biometric data of the one or more parties, user preferences, semantic preferences, or a combination thereof.

13. The system of claim 8, wherein the executable instructions further:
  learn one or more user preferences for preferred text data previously used in historical communication dialogs; and
  combine the one or more learned user preferences with the plurality of contextual factors for automatically completing the communication message.

14. The system of claim 8, wherein the executable instructions further initiate a machine learning mechanism to learn and predict one or more semantic candidates to complete or correct the communication message according to the plurality of contextual factors.

15. A computer program product for intelligent communication message completion by a processor, the computer program product comprising a non-transitory computer-readable storage medium having computer-readable program code portions stored therein, the computer-readable program code portions comprising:
  an executable portion that automatically completes a communication message according to a plurality of contextual factors associated with a communication dialog, wherein the plurality of contextual factors are classified as primary or secondary factors; and
  an executable portion that utilizes the primary factors to derive the secondary factors relevant to the communication dialog, wherein the secondary factors comprise spatiotemporal characteristics observed of a current and a predicted future environment of a user initiating the communication message and are utilized to enhance or adjust context decisions constituent to automatically completing the communication message such that textual content used to automatically complete the communication message is predicted to be contextually accurate according to the observed spatiotemporal characteristics.

16. The computer program product of claim 15, further including an executable portion that determines the plurality of contextual factors to complete text input data of the communication message using a machine learning operation.

17. The computer program product of claim 15, wherein the primary factors include at least a user profile, a geographical location, or combination thereof and the secondary factors include at least a selected period of time, weather data, calendar data, one or more events, a defined location, or a combination thereof; and
  further including an executable portion that completes the communication message according to the primary factors, the secondary factors, or a combination thereof.

18. The computer program product of claim 15, further including an executable portion that defines the plurality of contextual factors to include geolocation data, a time period, calendar data, a current status of one or more parties associated with the communication dialog, travel data, physical and biometric data of the one or more parties, user preferences, semantic preferences, or a combination thereof.

19. The computer program product of claim 15, further including an executable portion that:
  learns one or more user preferences for preferred text data previously used in historical communication dialogs; and
  combines the one or more learned user preferences with the plurality of contextual factors for automatically completing the communication message.

20. The computer program product of claim 15, further including an executable portion that initiates a machine learning mechanism to learn and predict one or more semantic candidates to complete or correct the communication message according to the plurality of contextual factors.

* * * * *